No. 703,789. Patented July 1, 1902.
A. L. HAWKINS.
HARNESS.
(Application filed July 29, 1901.)
(No Model.)
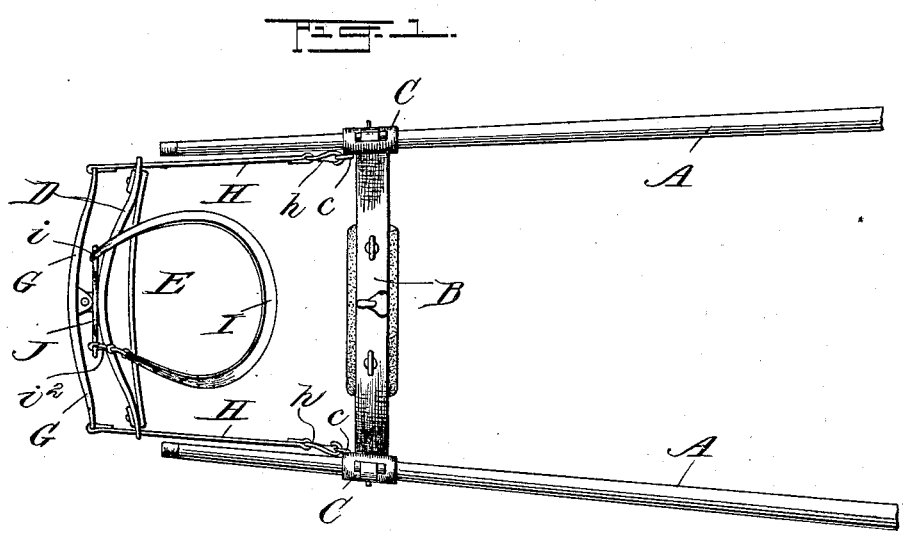
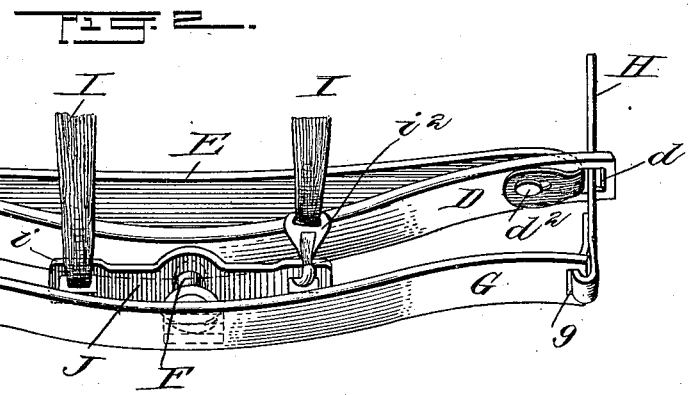
WITNESSES:
INVENTOR
Augustus L. Hawkins.
BY
ATTORNEYS.

UNITED STATES PATENT OFFICE.

AUGUSTUS LONGSTREET HAWKINS, OF GEORGETOWN, TEXAS, ASSIGNOR OF ONE-HALF TO JOSEPH M. PAGE, OF GEORGETOWN, TEXAS.

HARNESS.

SPECIFICATION forming part of Letters Patent No. 703,789, dated July 1, 1902.

Application filed July 29, 1901. Serial No. 70,080. (No model.)

*To all whom it may concern:*

Be it known that I, AUGUSTUS LONGSTREET HAWKINS, a citizen of the United States, and a resident of Georgetown, in the county of Williamson and State of Texas, have invented a new and Improved Harness, of which the following is a full, clear, and exact description.

The purpose of the invention is to provide a light and serviceable harness of few pieces so constructed that the traces will extend from a front singletree to a point at or near the saddle and belly-band, the collar of the harness being dispensed with and a shoulder-strap being employed instead and which serves as a support for the forward singletree.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a plan view of the improved harness and shafts of a vehicle; and Fig. 2 is a perspective view of the forward singletree, a draft bar and strap, and connected parts drawn upon an enlarged scale.

Referring to the drawings, A represents the shafts of a vehicle, B a saddle, and C sleeves carried by the saddle and adapted to receive the shafts A and to be secured thereto in any suitable manner. A draft-bar D, forwardly curved at its central portion, is adapted to be located in front of the breast of the animal, and at the rear of the draft-bar D a draft-strap E is located, the ends of which strap are passed through openings $d$ in the ends of the draft-bar D and are secured to the front face of the draft-bar by buttons $d^2$ or their equivalents. The draft-strap E is drawn more or less taut at the back of the draft-bar, and this strap is adapted to come directly in engagement with the breast of the animal.

At the center of the draft-bar D a forwardly-extending stud F is formed, and on this stud F a singletree G is adapted to laterally rock. This singletree G is a substitute for the ordinary singletree carried by the connecting-bar of the shafts, and said forward singletree G is provided with openings $g$ at its ends. At these openings $g$ the forward portions of short traces H are secured, the rear ends of the said traces being provided with snaps $h$, as shown in Fig. 1, adapted for engagement with eyes $c$ or their equivalents carried by the sleeves C.

In order that the animal shall have purchase in backing and, furthermore, in order to support the draft-bar, draft-strap, and singletree, a shoulder-strap I is provided, and this strap is secured at one end at $i$ to a rocking bar J, mounted on the stud F, while the other end of the shoulder-strap is connected with the opposite end of the rocking bar, preferably by means of a snap $i^2$.

It will be observed that the harness consists of but few parts outside of the bridle and that the singletree being placed at the front enables the traces to be shortened and produces the same result as if the singletree were placed in the usual position. The horse being unhampered at its body with the heavy harness usually employed has greater freedom of movement, and when the harness is constructed as described by disengaging the snap $i^2$ from the rocking bar J, unbuckling the belly-band, and disengaging one trace from one of the sleeves C the animal may leave the shafts when the same, with harness attached are raised off the animal, the harness remaining connected with the shafts and ready to be applied to the animal when the vehicle is to be again used. The backing and holding back is all done with the belly-band of the saddle.

Having thus described my invention, I claim as new and desire to secure by Letters Patent—

1. In harness, a forward draft-bar, a singletree mounted upon the forward side of the draft-bar, and a rocking shoulder-strap bar carried by the draft-bar, as set forth.

2. In harness, a forward draft-bar, a singletree mounted on the forward side of the draft-bar, and a rocking shoulder-strap bar mounted between the said draft-bar and singletree, as set forth.

3. In harness, a singletree, a forward draft-bar upon the front sides of which the singletree is mounted, said bar being provided with an opening at each end through which the traces attached to the singletree are adapted to pass, and a shoulder-strap bar carried by the draft-bar, as set forth.

4. In harness, a singletree, a forward draft-bar upon the front side of which the singletree is pivotally mounted, said bar being provided with an opening at each end through which the traces attached to the singletree are adapted to pass, and a pivotally-mounted shoulder-strap bar between the singletree and draft-bar, as set forth.

5. In harness, a draft-bar having an opening at each end, and provided with a central forwardly-projecting stud, a singletree pivotally mounted on the end of the stud, and a shoulder-strap bar pivotally mounted on the stud between the singletree and draft-bar, as set forth.

6. In harness, a curved draft-bar having an opening at each end and provided with a central forwardly-projecting stud, a draft-strap having its ends passed through the openings of the draft-bar and secured to said bar, a singletree mounted on the outer end of the stud, and a shoulder-strap bar mounted on the stud between the said bar and singletree, as set forth.

In testimony whereof I have signed my name to this specification in the presence of two subscribing witnesses.

AUGUSTUS LONGSTREET HAWKINS.

Witnesses:
C. H. GEE,
J. E. NEAL.